US009064388B1

(12) United States Patent
Razazian et al.

(10) Patent No.: US 9,064,388 B1
(45) Date of Patent: Jun. 23, 2015

(54) IMPULSE NOISE DETECTION AND CANCELLATION IN POWER LINE COMMUNICATION DEVICE

(71) Applicant: Maxim Integrated Products, Inc., San Jose, CA (US)

(72) Inventors: Kaveh Razazian, Aliso Viejo, CA (US); Qi Qu, Irvine, CA (US); Jiang Yue, Irvine, CA (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 196 days.

(21) Appl. No.: 13/763,788

(22) Filed: Feb. 11, 2013

(51) Int. Cl.
*G08B 1/08* (2006.01)

(52) U.S. Cl.
CPC ........................................ *G08B 1/08* (2013.01)

(58) Field of Classification Search
CPC ... H04L 27/22; H04L 27/227; H04L 27/2271; H04L 27/2275; H04L 27/2278; H04L 27/233; H04L 27/2331; H04L 27/38; H04L 27/3845; H04L 27/389; H04L 2201/06; G08B 1/08

USPC ......... 375/130, 147, 148, 150, 260, 262, 265, 375/324, 340, 341; 340/13.23, 13.24, 340/13.25, 13.26; 714/794, 795
See application file for complete search history.

(56) References Cited

U.S. PATENT DOCUMENTS

| | | | |
|---|---|---|---|
| 6,385,261 B1 * | 5/2002 | Tsuji et al. | 375/346 |
| 8,385,399 B2 * | 2/2013 | Yang et al. | 375/232 |
| 2008/0304587 A1 * | 12/2008 | Setoh et al. | 375/260 |
| 2012/0195384 A1 * | 8/2012 | Sato | 375/257 |
| 2013/0215885 A1 * | 8/2013 | Vijayasankar et al. | 370/389 |

* cited by examiner

Primary Examiner — Young T Tse (57) ABSTRACT

A receiver for a power line communication (PLC) device includes an analog front end configured to receive an input signal from a power line. The input signal includes symbols and wherein each of the symbols includes samples. A demodulator module is configured to demodulate the input signal to generate a demodulated signal. The demodulator module includes an impulse noise module configured to detect and remove impulse noise in the symbols of the input signal.

19 Claims, 12 Drawing Sheets

IMPULSE NOISE DETECTION AND CANCELLATION IN POWER LINE COMMUNICATION DEVICE

FIELD

The present disclosure relates to power line communication (PLC) systems, and more particularly to a PLC device with impulse noise detection and cancellation.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Power line communications (PLC) systems transmit and receive signals from a utility to homes over existing power lines in the homes. PLC systems have been used to provide connectivity between a utility and power meters, appliances and other devices located in the homes of consumers. Some of the challenges to the implementation of PLC systems include the relatively noisy environment of the power lines, implementation costs, and transmitting and receiving signals across a transformer.

Impulsive noise is one of the factors that makes the power line channel hostile. The high energy of time domain impulse noise translates into wideband noise spectrum, which tends to distort orthogonal frequency division modulation (OFDM) signals. Two types of impulsive noise typically exist on power line: periodic and random.

SUMMARY

A receiver for a power line communication (PLC) device includes an analog front end configured to receive an input signal from a power line. The input signal includes symbols. Each of the symbols includes samples. A demodulator module is configured to demodulate the input signal to generate a demodulated signal. The demodulator module includes an impulse noise module configured to detect and remove impulse noise in the symbols of the input signal.

In other features, the receiver further includes a forward error correction (FEC) decoder module configured to decode the receive data. The impulse noise module comprises a magnitude measurement module configured to determine an average magnitude of the samples in the symbols of a portion of a preamble of the input signal and to set a magnitude threshold based on the average magnitude. A coarse detection module is configured to use a sliding window and the magnitude threshold to determine one or more positions of impulse noise in T adjacent symbols, wherein T is an integer greater than zero. A fine detection module is configured to locate rising and falling edges of the impulse noise based on one or more of the positions and to determine one or more erase positions based on the rising and falling edges.

In other features, the impulse noise module includes a coarse detection module configured to a) compare a magnitude of the samples in a sliding window with the magnitude threshold, b) increase a first count when the magnitude of the samples in the sliding window is greater than or equal to the magnitude threshold, c) record a position of the sliding window as a coarse position when the first count is greater than or equal to a first predetermined count, and d) move the sliding window and repeat a), b) and c) until the sliding window is at a last one of the samples.

In other features, the coarse detection module is further configured to a) compare a magnitude of the samples in a first sliding window with the magnitude threshold, b) compare a magnitude of the samples in a second sliding window with the magnitude threshold, wherein the first and second sliding windows are contiguous, c) increase a second count when the magnitude of the samples in the first sliding window is greater than or equal to the magnitude threshold, d) increase a third count when the magnitude of the samples in the second sliding window is greater than or equal to the magnitude threshold, e) repeat a), b), c) and d) for all of the samples in the first and second sliding windows, f) if both the second count and the third count are greater than or equal to a first predetermined count, record a backup position for the first and second sliding windows, g) if either the second count or the third count is greater than or equal to a second predetermined count, record a backup position for a corresponding one of the first sliding window or the second sliding window depending on which count was exceeded; and h) move the first and second sliding windows and repeat a), b), c), d) and e) until the second sliding window is at a last one of the samples.

In other features, a fine detection module is configured to detect rising and falling edges of the impulse noise in the one or more coarse positions. If the fine detection module does not detect the rising edge or the falling edge in T symbols and some of the one or more backup positions are recorded for all of the T symbols, wherein T is an integer greater than zero, the fine detection module sets a detection flag. If the fine detection module does not detect the rising edge or the falling edge in the T symbols and the one or more backup positions are not recorded for all of the T symbols for an entire symbol when T is equal to one, the fine detection module turns off the detection flag.

In other features, when the fine detection module detects the falling edge and does not detect the rising edge before the falling edge and the detection flag is on, the fine detection module turns off the detection flag and sets the erase position based on a beginning of a first one of the T symbols and the falling edge. When the fine detection module detects the falling edge and does not detect the rising edge before the falling edge, the detection flag is not on and the falling edge is not inside of the backup position, the fine detection module sets the erase position based on the falling edge and a backward adjustment. When the fine detection module detects the falling edge and does not detect the rising edge before the falling edge, the detection flag is not on and the falling edge is inside of the backup position, the fine detection module sets the erase position based on a start of the backup position and the falling edge.

In other features, when the fine detection module detects the rising edge and does not detect the rising edge before the falling edge: if the rising edge occurs between a start and an end of one of the backup positions, the fine detection module turns on the detection flag and sets the erase position based on the rising edge and an end of a corresponding one of the backup positions; and if the rising edge does not occur between a start and an end of one of the backup positions, the fine detection module turns on the detection flag and sets the erase position based on the rising edge and a forward adjustment.

In other features, when the fine detection module detects both the rising edge and the falling edge and the rising edge is detected before the falling edge, the fine detection module stores an erase position based on the rising edge and the falling edge.

In other features, a noise cancellation module is configured to, when an index of a sample is equal to one of the plurality of erase positions, selectively adjust an amplitude and phase of an erase sample; selectively erase the sample; selectively scale a magnitude of the sample; or selectively saturate the magnitude of the sample based on a threshold.

Further areas of applicability of the present disclosure will become apparent from the detailed description, the claims and the drawings. The detailed description and specific examples are intended for purposes of illustration only and are not intended to limit the scope of the disclosure.

DESCRIPTION

A system and method for impulse noise detection and cancellation according to the present disclosure enhances the reliability of the PLC receiver and the PLC system. The system and method for impulse noise detection and cancellation scans a received signal and detects a location and duration of impulsive noise occurrences in a time domain. The system and method for impulse noise detection and cancellation reduces signal distortion in the time domain. As a result, noise spectrum is reduced correspondingly in a frequency domain. The cancellation in noise spectrum boosts a signal to noise ratio (SNR) for the PLC receiver. In some examples, the impulse noise detection and cancellation is performed at a front end of a receiver baseband system. Therefore, the SNR benefit applies to succeeding functional blocks.

Figure 1:
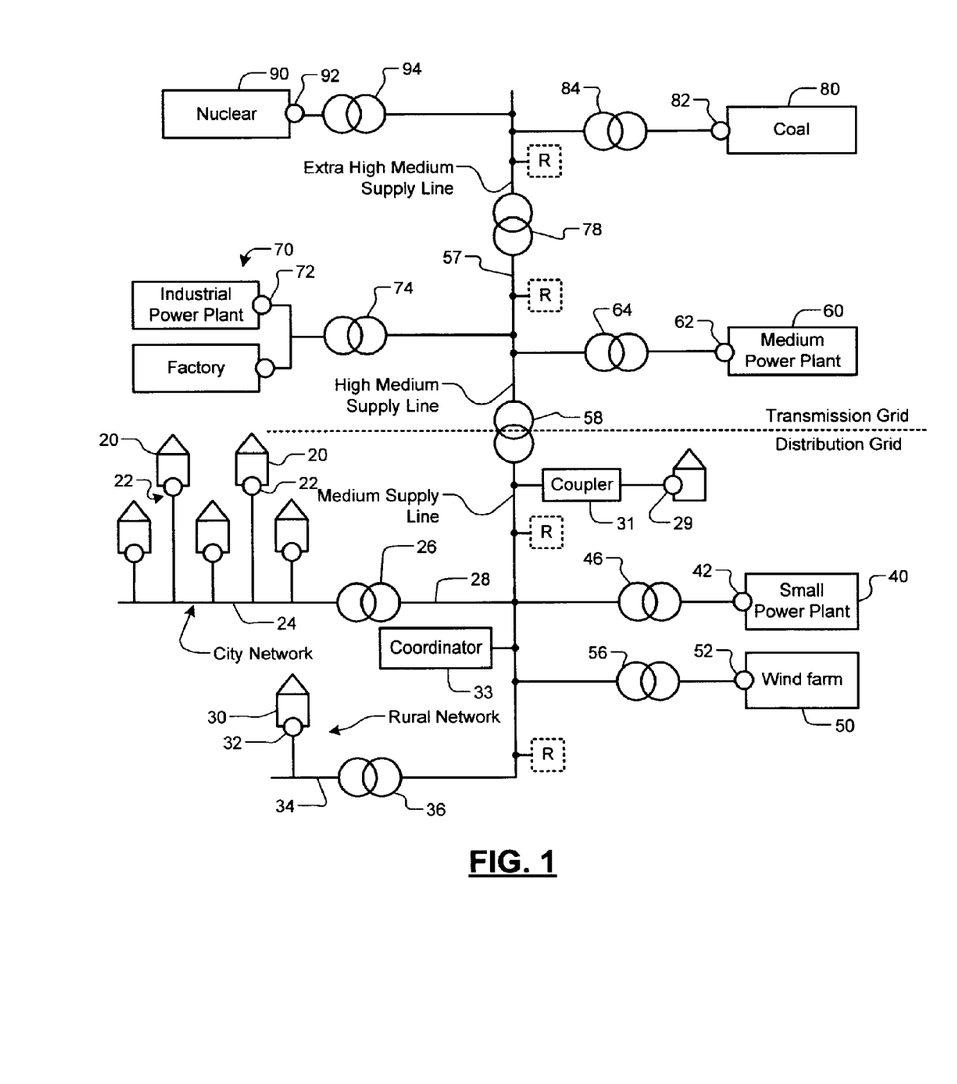
FIG. 1 illustrates an example of a PLC system according to the present disclosure.

Referring now to FIG. 1, an example of a power system is shown. The power system includes a city network with one or more homes 20 that are connected by a PLC device 22 to a power line 24. The power line 24 is connected by a transformer 26 to a medium supply line 28. In some examples, a PLC device 29 may also be connected directly (without a transformer) to the medium supply line 28 by a coupler 31, which may serve as a network coordinator or a repeater. One or more network coordinators 33 may be connected to the medium supply line 28. The power system may also be connected via a transformer 36 to a rural network including one or more homes 30 connected by a PLC device 32 to a power line 34. The medium supply line 28 may also communicate with a PLC device 42 associated with a small power plant 40 through a transformer 46. The medium supply line 28 may also communicate with a PLC device 52 associated with a wind farm 50 through a transformer 56.

The medium supply line 28 may communicate with a high medium supply line 57 through a transformer 58. A PLC device 62 associated with a medium power plant 60 may communicate with the high medium supply line 57 through a transformer 64. A PLC device 72 associated with an industrial power plant and factory 70 may communicate with the high medium supply line 57 through a transformer 74.

An extra high medium supply line 76 may communicate with the high medium supply line 57 through a transformer 78. A PLC device 82 associated with a coal plant 80 may communicate with the extra high medium supply line 76 through a transformer 84. Likewise, a PLC device 92 associated with a nuclear plant 90 may communicate with the extra high-voltage line 76 through a transformer 94. One or more routers R or network coordinators (not shown) may be provided as intermediate nodes to receive, forward and route packets between the PLC devices. In some examples, a transformer is located between the source node and the destination node. In other examples, communication can take place over the medium supply line without any transformer between source and destination nodes.

Figure 2:
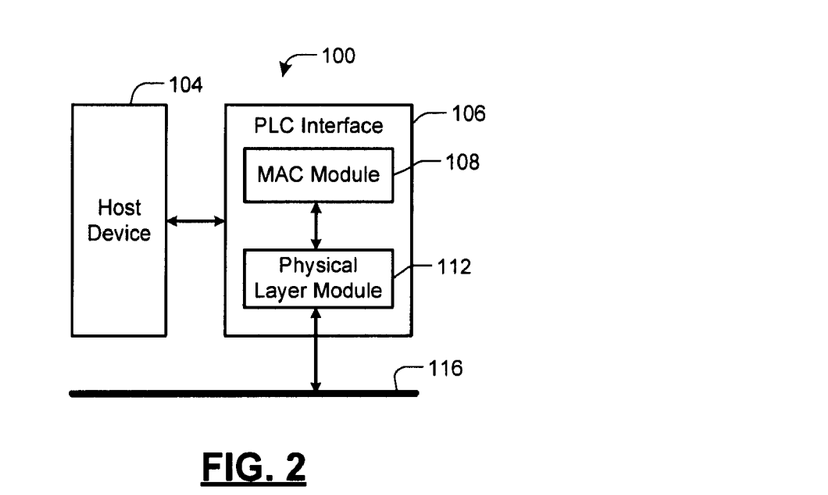
FIG. 2 is a functional block diagram of an example of a PLC device according to the present disclosure.
Figure 3:
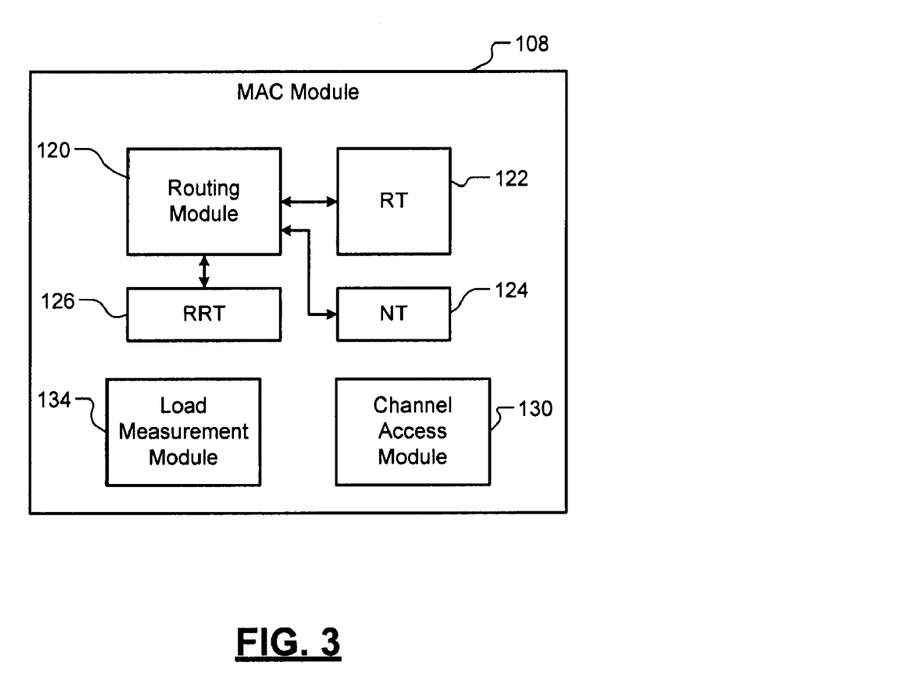
FIG. 3 is a functional block diagram of an example of a MAC module according to the present disclosure.

Referring now to FIGS. 2 and 3, an example of a PLC device 100 is shown. The PLC device 100 includes a host device 104 and a PLC interface 106. The PLC interface 106 includes a medium access control (MAC) module 108 and a physical layer (physical layer) module 112. In some implementations, the MAC module 108 includes both the Media Access Control Layer and an Adaptation Layer of the PLC device 100. The physical layer module 112 provides connectivity with a medium such as a power line 116. The MAC module 108 performs higher-level processing of the transmitted and received data.

In FIG. 3, some examples of the MAC module 108 may include a routing module 120, a routing table (RT) 122, a neighbor table (NT) 124 and a route request table (RRT). In some implementations, the routing module 120, the RT 122, the NT 124 and the RRT 126 may be located in the Adaptation Layer of the MAC module 108. Additional details relating to the routing module 120, the RT 122, the NT 124 and the RRT 126 may be found in U.S. patent application Ser. No. 13/708,008, filed on Dec. 7, 2012, which is hereby incorporated by reference in its entirety. The MAC module 108 may include a channel access module 130 to assist with channel access. The MAC module 108 may include a channel load measurement module 134 to estimate traffic on the PLC channel, as will be described further below.

Figure 4A:
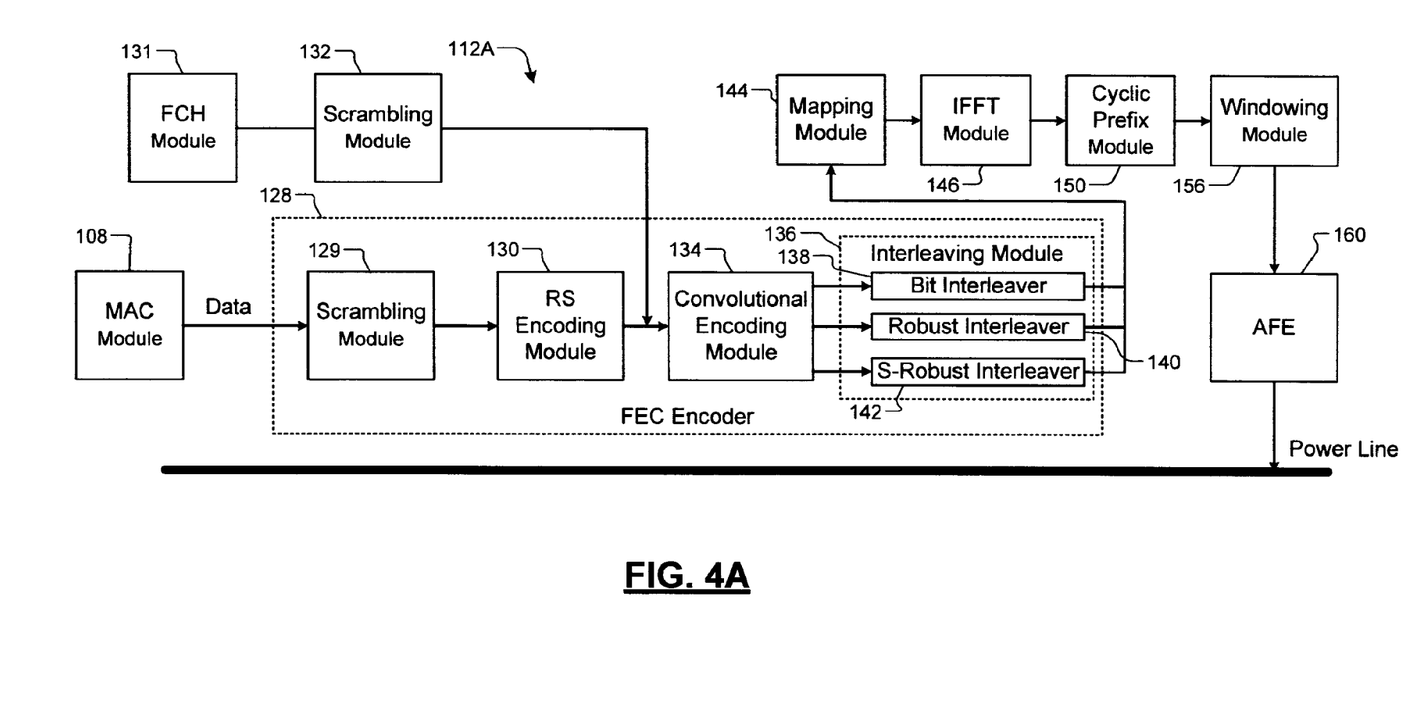
FIGS. 4A and 4B are functional block diagrams of examples of a transmitter and a receiver, respectively, according to the present disclosure.

Referring now to FIG. 4A, an example of a transmitter portion of the physical layer module 112A is shown. The MAC module 108 outputs data to a forward error correction (FEC) encoding module 128. The FEC encoding module 128 performs encoding and includes a scrambling module 129 to scramble the data, a Reed Solomon (RS) encoding module 130 to perform RS encoding, a convolutional encoding module 134 to perform convolutional encoding and an interleaving module 136 to perform interleaving. The MAC module 108 outputs frame control information to a frame control header (FCH) module 131 to generate a frame control header for the packets which is then scrambled by a scrambling module 132. An output of the scrambling module 132 is input to the convolutional encoding module 134.

The interleaving module 136 includes a bit interleaver 138, a robust interleaver 140 and a super robust interleaver 142. An output of the FEC encoding module 128 is input to a mapping module 144 that performs orthogonal frequency division multiplexing (OFDM) mapping such as but not limited to differentially-encoded binary phase shift keying (DBPSK), differentially-encoded quadrature phase shift keying (DQPSK) and/or other types of modulation. An output of the mapping module 144 is input to an inverse fast Fourier transform (IFFT) module 146. An output of the IFFT module 146 is input to a cyclic prefix module 150. An output of the cyclic prefix module is input to a windowing module 156. An output of the windowing module 156 is input to an analog front end 160.

Figure 4B:
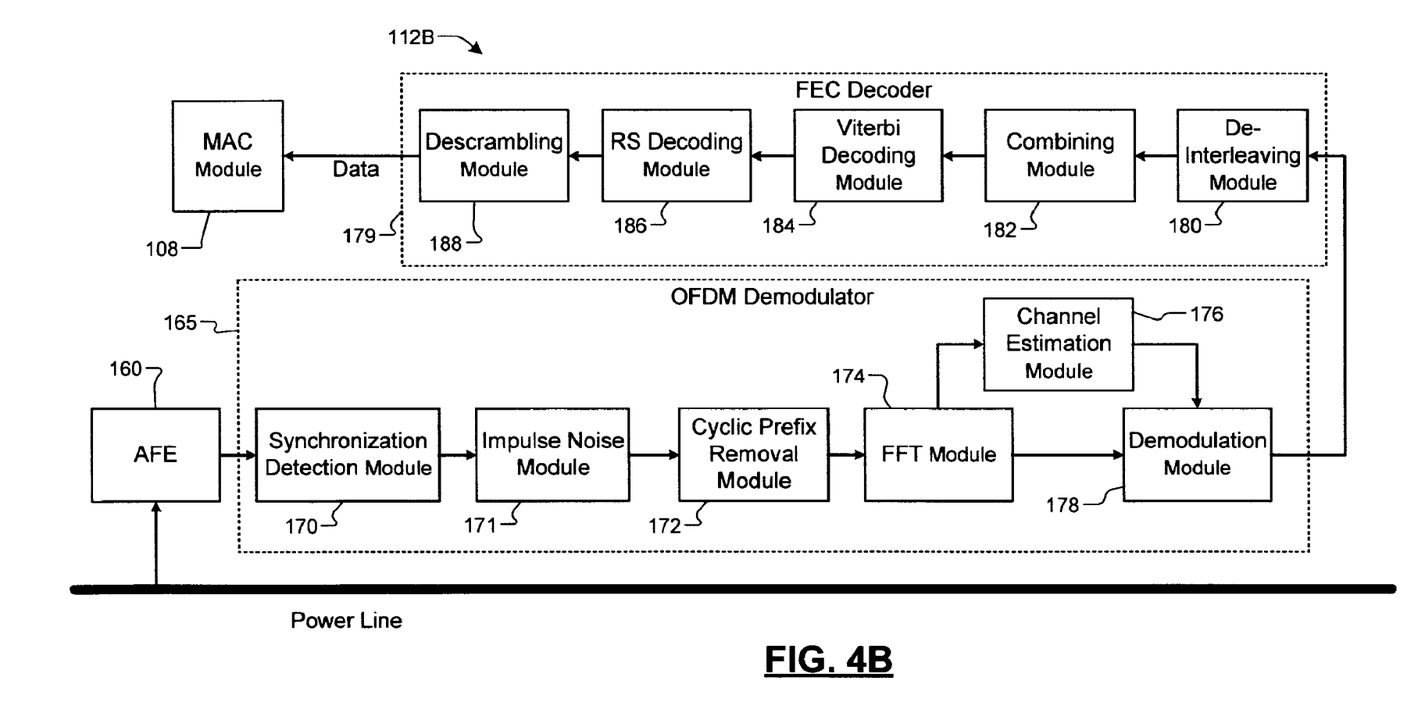

Referring now to FIG. 4B, an example of a receiver portion of the physical layer module 112B is shown. The analog front end (AFE) 160 communicates with the power line and outputs a received signal to an OFDM demodulating module 165. The OFDM demodulating module 165 includes a synchronization detection module 170, an impulse noise module 171, a cyclic prefix (CP) removal module 172, a fast Fourier transform (FFT) module 174, a channel estimation module 176, and a demodulation module 178.

An output of the OFDM demodulating module 165 is input to a FEC decoding module 179. The FEC decoding module 179 includes a de-interleaving module 180, a combining module 182, a Viterbi decoding module 184, a RS decoding module 186 and a descrambling module 188. An output of the FEC decoding module 179 provides data to the MAC module 108.

Additional details relating to the transmitter and receiver modules described above can be found in "SYSTEM AND METHOD FOR APPLYING MULTI-TONE OFDM BASED COMMUNICATIONS WITHIN A PRESCRIBED FREQUENCY RANGE", U.S. Pat. No. 8,315,152, and "TRANSMITTER AND METHOD FOR APPLYING MULTI-TONE OFDM BASED COMMUNICATIONS WITHIN A LOWER FREQUENCY RANGE", U.S. patent application Ser. No. 12/795,537, filed on Jun. 7, 2010, which are both hereby incorporated by reference in their entirety.

The transceivers disclosed therein use a combination of adaptive tone mapping, interleaving in frequency and time, and robust and super-robust encoding modes to provide reliable communication on a power line channel. The transceivers may operate in a frequency band from 1 kHz to 600 kHz. The transceivers use adaptive tone mapping, which involves requesting a tone map from a link partner. The transceiver associated with the link partner performs channel estimation, generates the tone map and sends the tone map to the requesting transceiver. The requesting transceiver uses the tone map to update its NT and modulates an output of the encoding module to selected orthogonal tones located in the frequency band based on a mapping table received form the link partner. In some implementations, frequency pre-emphasis may be used to pre-emphasize at least one or more of the selected orthogonal tones to compensate for estimated attenuation during propagation of a transmitted signal. When using the foregoing signal processing techniques, the transceivers are able to transmit and receive across a transformer to the transceiver associated with the link partner.

Figure 5:
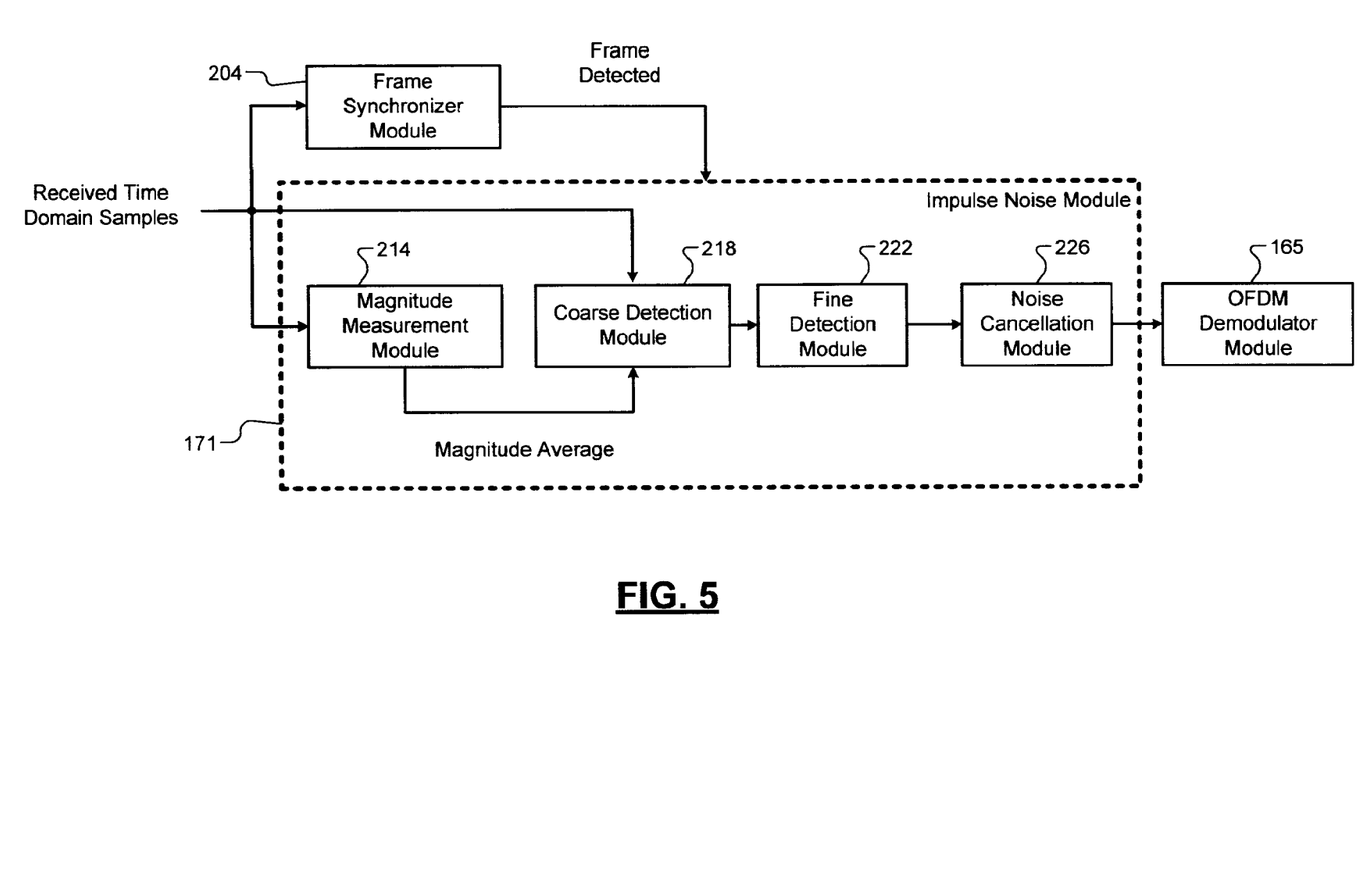
FIG. 5 is a functional block diagram of an example of an impulse noise module.

Referring now to FIG. 5, received time domain samples are input to a frame synchronizer module 204 and the impulse noise module 171. The impulse noise module 171 includes a magnitude measurement module 214, which measures the average magnitude of the samples and outputs the magnitude average to the coarse detection module 218. An output of the coarse detection module 218 is input to a fine detection module 222. An output of the fine detection module 222 is input to a noise cancellation module 226, which may adjust a phase and/or a magnitude of samples and/or symbols. An output of the impulse noise module 171 is input to the cyclic prefix (CP) removal module 172.

A preamble includes SYNCP and SYNCM symbols. In some examples, the SYNCP symbols may include 256 samples. In some examples, the SYNCM symbol includes 256 samples and may be an inverse of samples of the SYNCP symbol. The frame synchronizer module 204 detects the presence of the preamble, finds the correct symbol alignment position and then detects the transition from the SYNCP to SYNCM symbol in order to decode the data that follows.

The magnitude measurement module 214 generates the magnitude average of a plurality of samples and uses the average magnitude when performing coarse detection of impulse noise in the coarse detection module 218. The fine detection module 222 detects rising and falling edges of the impulse noise and performs corrections based on locations of the rising and falling edges relative to the samples.

Figure 6:
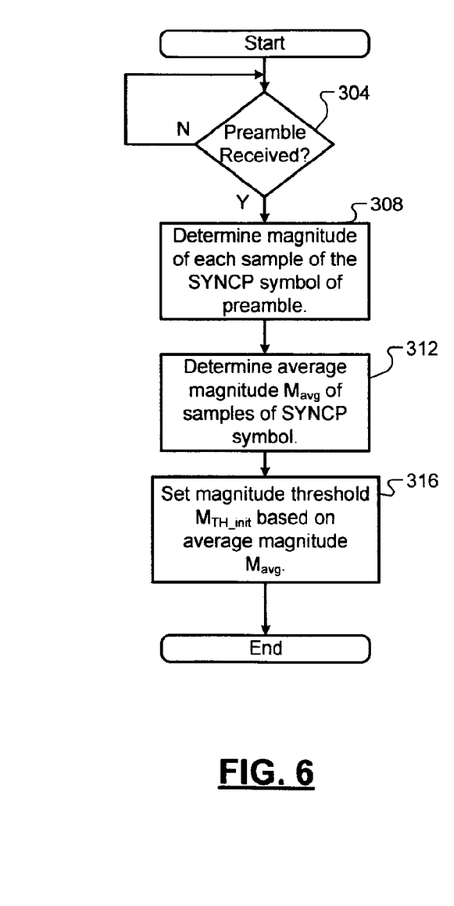
FIG. 6 is a flowchart illustrating an example of operation of a magnitude measuring module.

FIG. 6 shows an example of operation of the magnitude measurement module 214 of the impulse noise module 171 to determine an average of the received signal magnitude. In some examples, the magnitude measurement module 214 performs the measurement based on the received SYNCP samples, although other samples may be used. While the measurement may be performed using signal power or signal magnitude, measuring signal magnitude rather than signal power tends to reduce computational cost. A threshold may be set for coarse detection based on the measured average magnitude.

At 304, control determines whether a preamble has been received. At 308, a magnitude of each sample of the SYNCP symbol in the preamble is determined. At 312, the average magnitude $M_{avg}$ of the samples of the SYNCP symbol in the preamble is determined. At 316, a magnitude threshold $M_{TH\_init}$ is set based on the average magnitude $M_{avg}$. In some examples, the magnitude threshold $M_{TH\_init}$ is a multiple of $M_{avg}$. In some examples, $M_{TH\_init} = M_{avg} \times 2$.

Figure 7A:
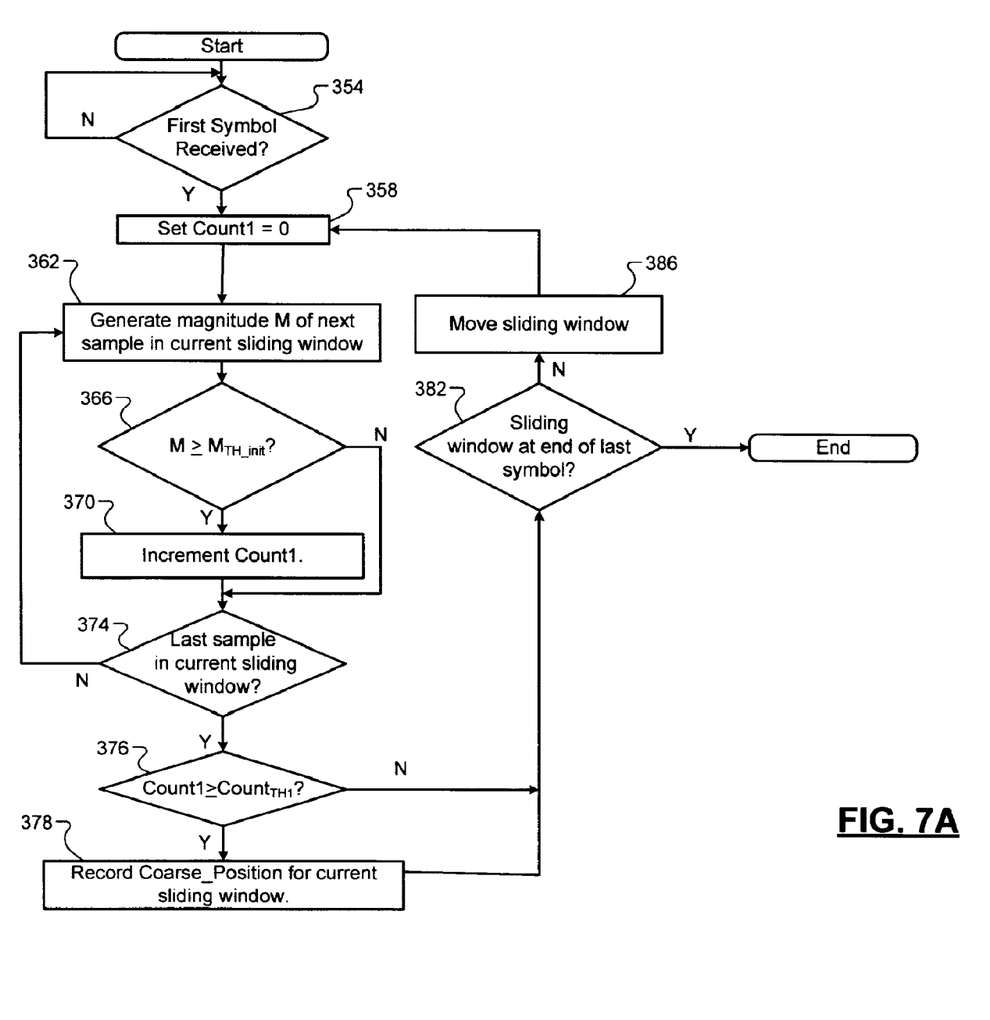
FIG. 7A is a flowchart illustrating an example of operation of a coarse detection module.
Figure 8A:
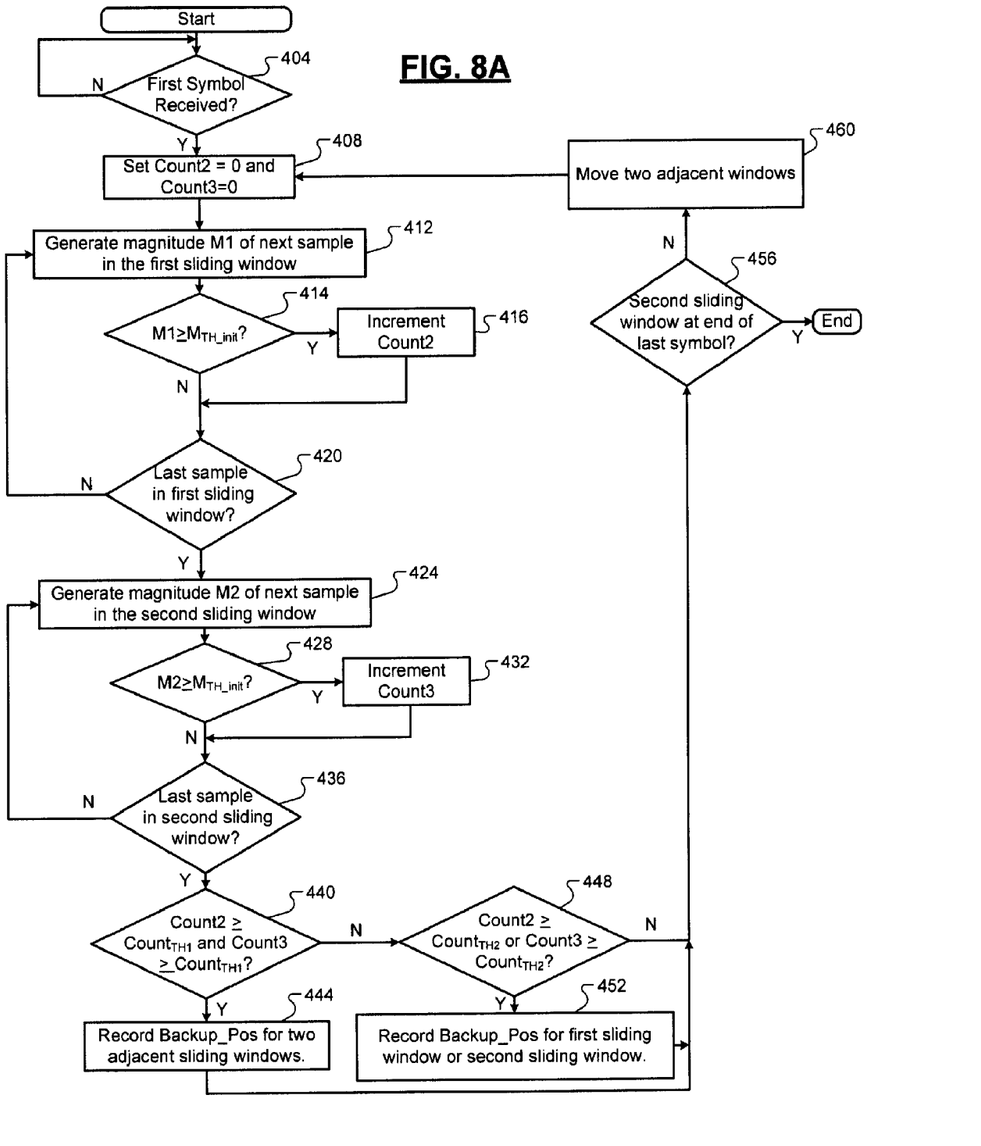
FIG. 8A is a flowchart illustrating an example of operation of a coarse detection module with protection.

Referring now to FIGS. 7A and 8A, examples of coarse detection and coarse detection with protection are shown, respectively. In FIG. 7A, the coarse detection module finds the potential occurrences of impulse noise using a sliding window based on the magnitude threshold $M_{avg}$. Moreover, the coarse detection module utilizes two additional thresholds. The first threshold is $Count_{TH1}$ or MAGNITUDE_COUNT which is used to mark the potential of impulse noise in the current and next symbol with start and stop sample indices. The second threshold is $Count_{TH2}$ or MAGNITUDE_COUNT_PROTECT which is used to record sample indices for protection in case that fine detection does not find any impulse noise.

FIG. 7A shows an example of coarse detection. At 354, control determines whether a first symbol is received. If true, control continues with 358 and sets Count1 equal to zero. At 362, control generates a magnitude M of the next sample in a current sliding window. At 366, control determines whether the magnitude M is greater than or equal to $M_{TH\_init}$. If 366 is true, control increments Count1 at 370. At 374, control determines whether this is the last sample in the current sliding window. If not, control returns to 362. Otherwise, control determines whether Count1 is greater than or equal to $Count_{TH1}$. If 376 is true, control records a Course_Position for the current sliding window. Control continues from 376 (if false) and 378 with 382. At 382, control determines whether the sliding window is at the end of the last symbol. If not, control moves the sliding window at 386 and control continues with 358. Otherwise, control ends.

Figure 7B:
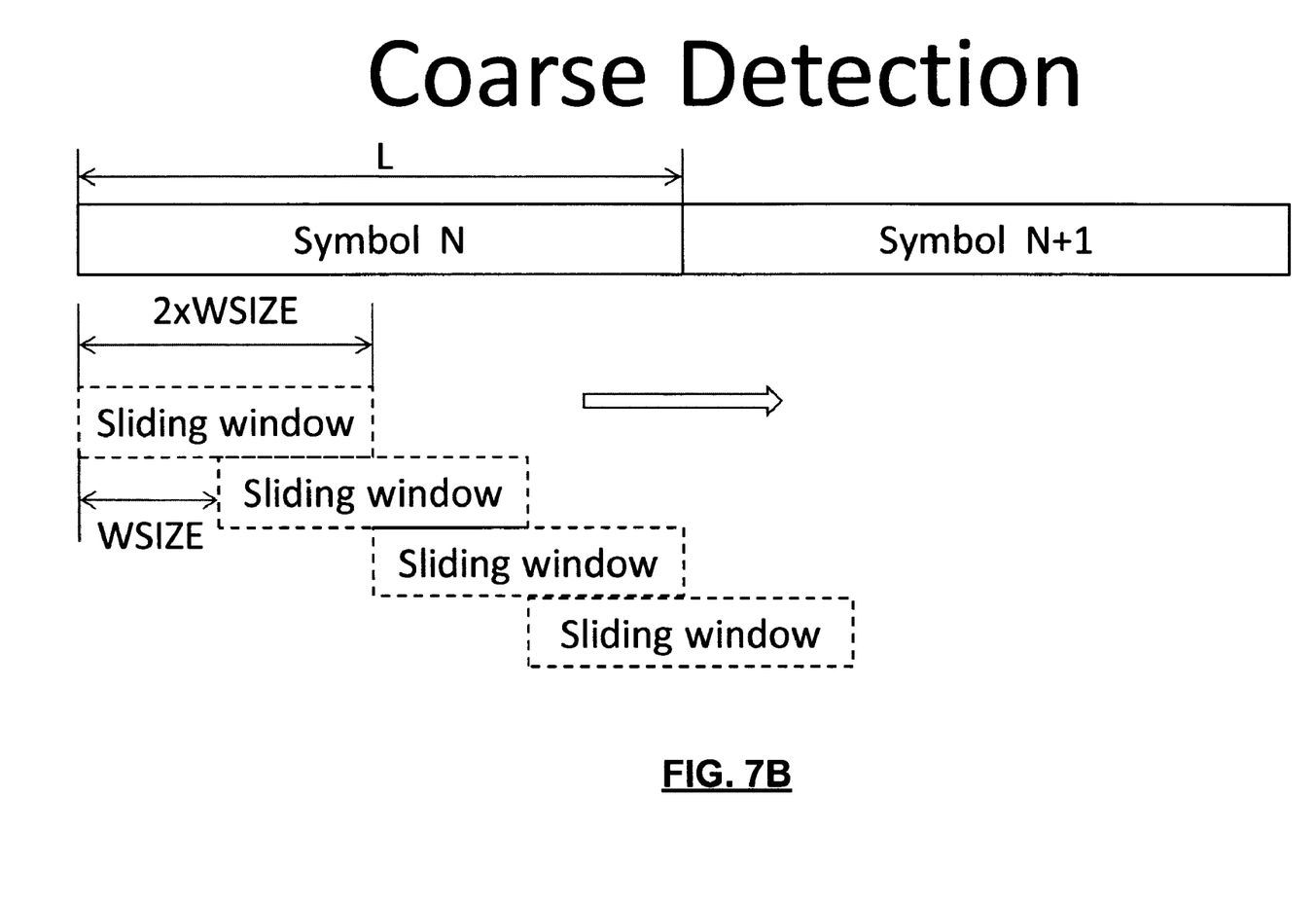
FIG. 7B illustrates an example of coarse detection.

FIG. 7B illustrates an example of coarse detection. In this example, the symbol length is twice a length of a sliding window, in other words, L=4×WSIZE. The sliding window will shift to right three times with a step of WSIZE. The 1st sliding window spans over [0, 2×WSIZE-1]. The 4th sliding window spans over [3×WSIZE, L+WSIZE-1]. In the next iteration, the symbol N will be discarded, the symbol N+1 will be shifted and a symbol N+2 will be added. Therefore, the sliding window need not move over all of the symbol N+1 since it will be analyzed in the next iteration.

FIG. 8A shows an example of coarse detection with protection. At 404, control determines whether a first symbol is received. If true, control continues with 408 and sets Count2 and Count3 equal to zero. At 412, control generates a magnitude M1 of the next sample in the first sliding window. At 414, control determines whether M1 is greater than or equal to $M_{TH\_init}$. If 414 is true, control increments Count2 at 416. Control continues from 414 (if false) or 416 with 420 where control determines whether this is the last sample in the first sliding window. If 420 is false, control returns to 412. If 420 is true, control continues with 424 where control generates a magnitude M2 of the next sample in the second sliding window. At 428, control determines whether M2 is greater than or equal to $M_{TH\_init}$. Control continues from 428 (if false) or 432 with 436 where control determines whether this is the last sample in the second sliding window. If 436 is false, control returns to 424. If 436 is true, control continues with 440. At 440, control determines whether Count2 is greater than or equal to $Count_{TH1}$ and whether Count3 is greater than or equal to $Count_{TH1}$. If 440 is true, control records Backup_Pos for the two adjacent sliding windows.

If 440 is false, control continues with 448 where control determines whether Count2 is greater than or equal to $Count_{TH2}$ or whether Count3 is greater than or equal to $Count_{TH2}$. If 448 is true, control records Backup_Pos for a corresponding one of the first sliding window or the second sliding window depending on which count was exceeded. Control continues from 448 (if false), 444 or 452 with 456 where control determines whether the second sliding window is at the end of the last symbol. If false, control moves two adjacent windows at 460 and control continues with 408. If 456 is true, control ends.

Figure 8B:
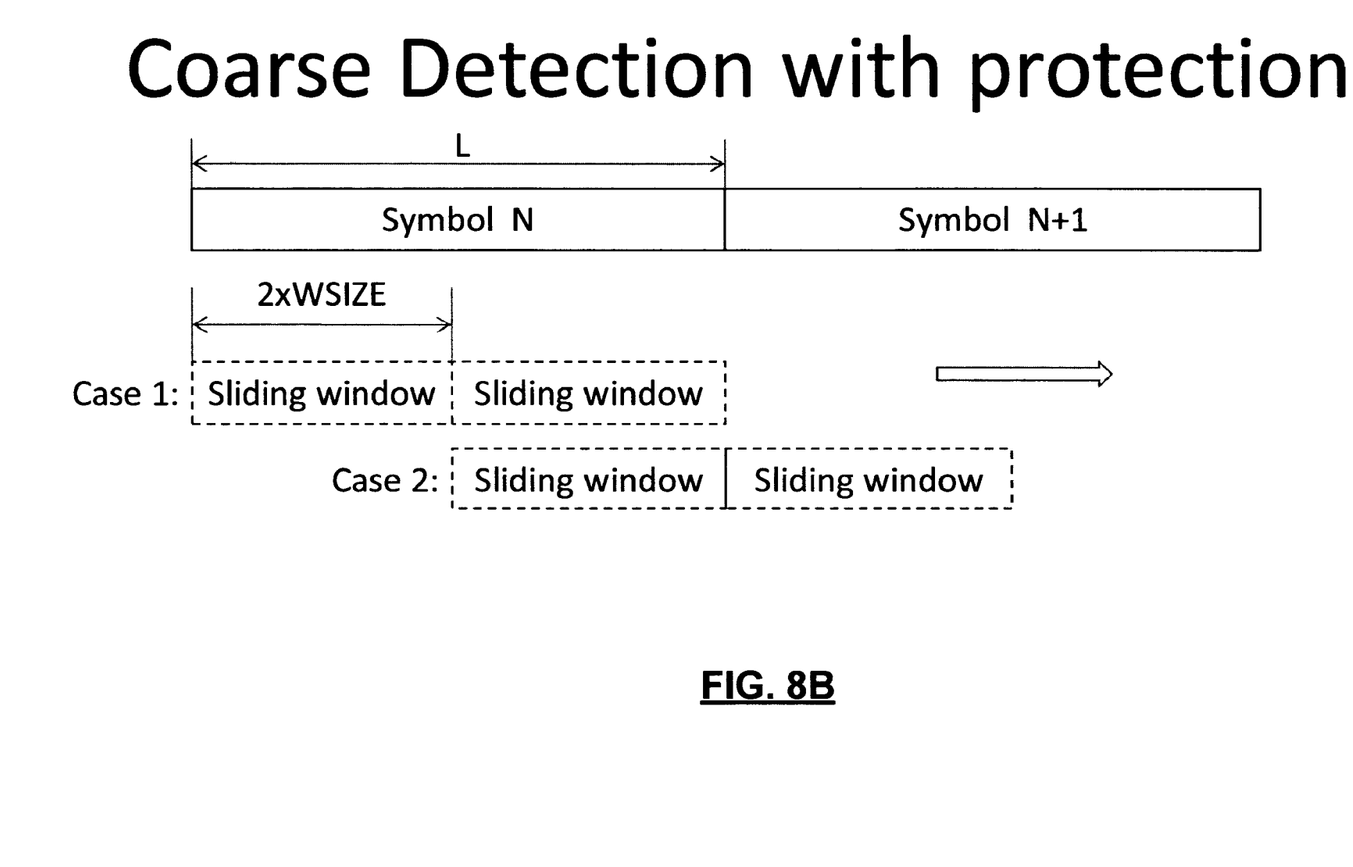
FIG. 8B illustrates an example of coarse detection with protection.

Referring now to FIG. 8B, an example of coarse detection with protection is shown. The symbol length is twice a length of a sliding window. In other words, L=4×WSIZE. The group of two sliding windows will shift to right one time with a step of 2×WSIZE. The 1st group of dual sliding windows spans over [0, L-1]. The 2th group of dual sliding windows spans over [L/2-1, L+L/2-1].

Figure 9A:
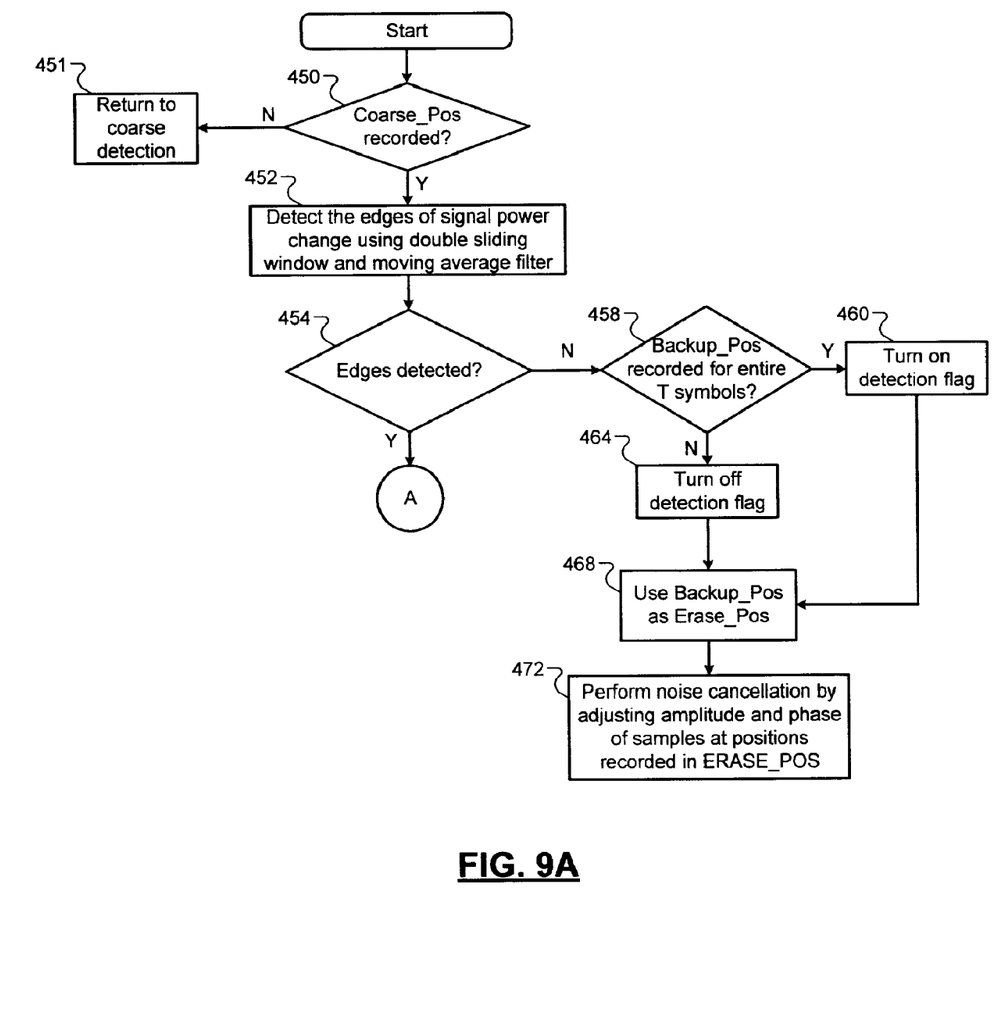
FIGS. 9A and 9B are flowcharts illustrating an example of operation of a fine detection module.
Figure 9B:
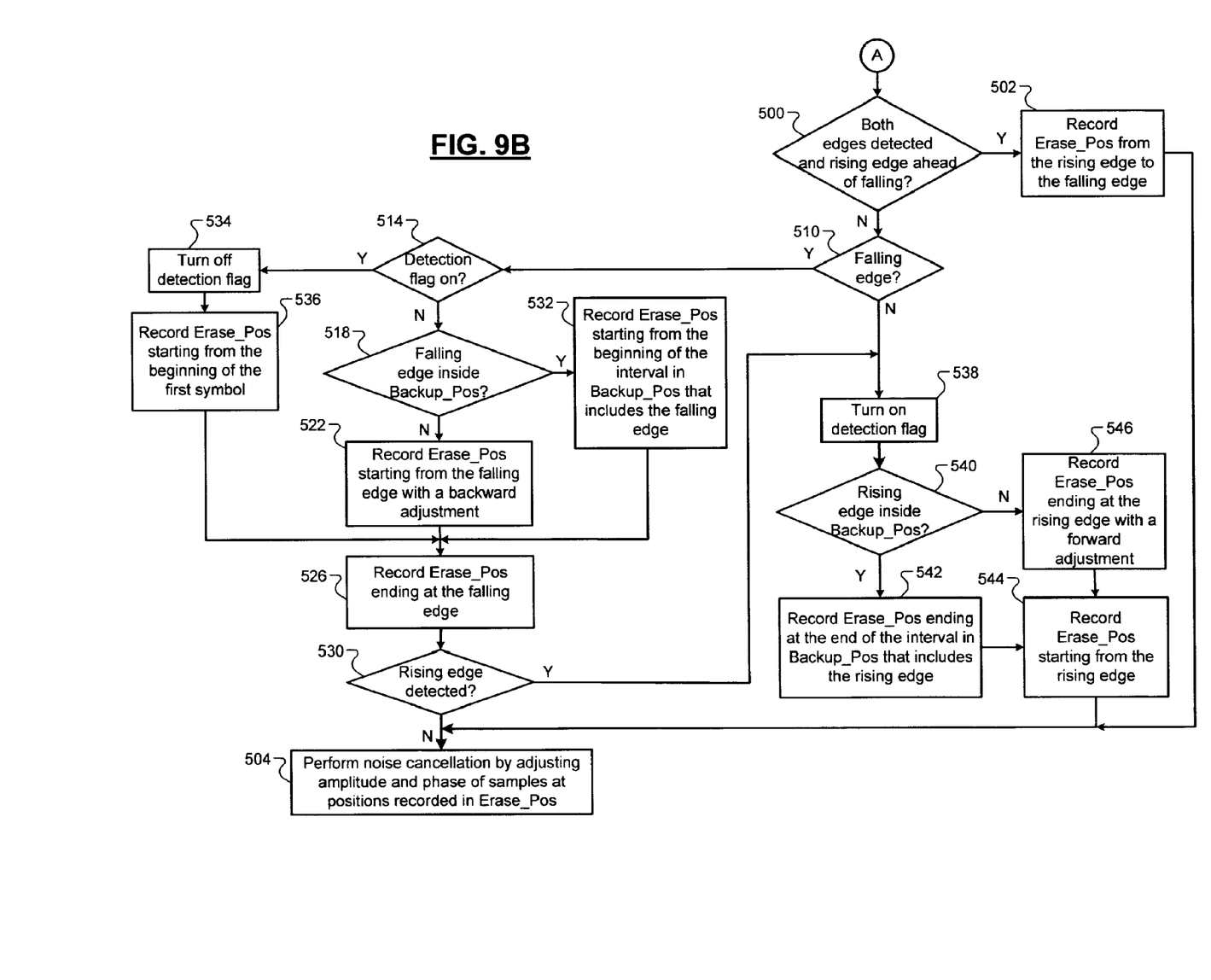

Referring now to FIGS. 9A and 9B, the fine detection module finds the duration of impulse noise using double sliding windows over the samples that were marked by the coarse detection. If edges of the impulse noise are detected, the duration is indicated by sample indices. If no edge is detected, protection is kicked in.

At 450, control determines whether a Coarse_Pos has been recorded. If 450 is false, control continues with coarse detection at 451. At 452, control detects the edges of signal power change using double sliding windows and a moving average filter. At 454, control determines whether the edges have been detected. If 454 is true, control continues with FIG. 9B, which is described below. If 454 is false, control determines whether the Backup_Pos was recorded for the entire (T-1) symbols if T is greater than 1 or for the entire symbol if T is equal to 1. In some examples, T is equal to 2, although T may be greater than 2. If 458 is true, control turns on a detection flag at 460. If 458 is false, control turns off the detection flag at 464. Control continues from 464 and 460 with 468 where control sets Erase_Pos equal to the Backup_Pos. At 472 noise cancellation is performed by adjusting amplitude and phase of samples at positions recorded in the Erase_Pos.

Control continues from 454 with 500 in FIG. 9B. At 500, control determines whether both rising and falling edges were detected and the rising edge is ahead of the falling edge. If 500 is true, control continues at 502 and sets the Erase_Pos from the rising edge to the falling edge. At 504, control performs noise cancellation by adjusting amplitude and phase of samples at positions recorded in the Erase_Pos.

If 500 is false, control continues with 510 and determines whether a falling edge was detected. If 510 is true, control continues with 514 and determines whether the detection flag is on. If 514 is false, control determines whether the falling edge is inside of the Backup_Pos. If 518 is false, control records Erase_Pos starting from the falling edge with a backward adjustment. Backward adjustment refers to an offset in reverse chronological order. In some examples, the offset is calculated proportional to the coarse detection window size.

At 526, control records Erase_Pos ending at the falling edge. At 530, control determines whether rising edge was detected. If 530 is false, control continues with 504, which is described above. If 518 is true, control records Erase_Pos starting from the beginning of the interval in Backup_Pos that includes the falling edge and continues with 526.

If 514 is true and the detection flag is on, the detection flag is turned off at 534. At 536, control records Erase_Pos starting from the beginning of the first symbol of T symbols. Control continues from 536 with 526, which is described above.

If 530 is true, control continues at 538. At 538, control turns on the detection flag. At 540, control determines whether the rising edge is inside Backup_Pos. If 540 is true, control records Erase_Pos ending at the end of the interval in Backup_Pos that includes the rising edge at 542. Control continues with 544 and records Erase_Pos starting from the rising edge. Control continues from 544 with 504, which is described above.

If 540 is false, control records Erase_Pos ending at the rising edge with a forward adjustment. Forward adjustment refers to an offset in chronological order. In some examples, the offset is calculated proportional to the coarse detection window size. Control continues from 546 with 544, which was described above.

Figure 10:
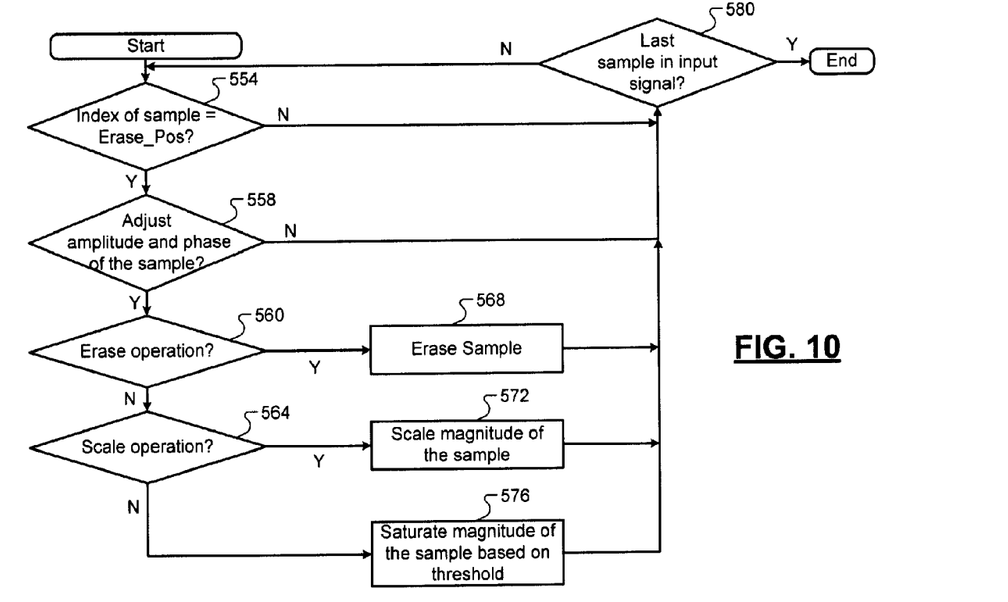
FIG. 10 is a flowchart illustrating an example of operation of a noise cancellation module.

Referring now to FIG. 10, noise cancellation is performed on the recorded samples according to the result of the fine detection. At 554, control determines whether an index of the sample is equal to Erase_Pos. If 554 is false, control continues with 580 where control determines if this is the last sample in the input signal. If 580 is false, control returns to 554. Otherwise if 580 is true, control ends.

If 554 is true, control continues with 558 where control determines whether the amplitude and phase of the sample needs to be adjusted. If 558 is false, control continues with 580 described above. If 558 is true, control continues with 560 where control determines whether an erase operation needs to be formed. If 560 is true, control erases the sample at 568 and control continues with 580. If 560 is false, control continues with 564 where control determines whether a scale operation needs to be formed. If 564 is true, control scales the magnitude of the sample at 572 and control continues with

580. If 564 is false, control continues with 576 and saturates the magnitude of the sample based on a threshold. Control continues from 576 with 580.

Figure 11:
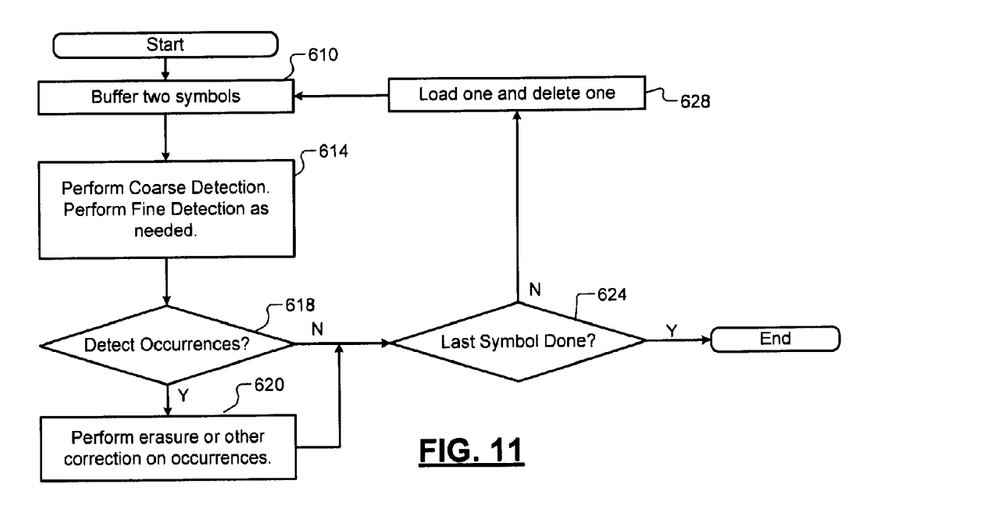
FIG. 11 is a flowchart illustrating an example of loading of symbols for analysis.

Referring now to FIG. 11, in some examples, T is set equal to two symbols, although additional symbols can be analyzed in each cycle. At 610, two symbols are buffered in memory. At 614, coarse detection is performed followed by fine detection as needed. At 618, control determines whether occurrences have been detected. If 618 is true, noise cancellation is performed on the occurrences at 620. Control continues from 618 and 620 with 624 where control determines whether the last symbol of the input signal is done. If 624 is false, control loads one symbol and discards one symbol at 628 and control continues with 610. If 624 is true, control ends. As can be appreciated, additional symbols may be handled in each cycle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A receiver for a power line communication (PLC) device, comprising:
    an analog front end configured to receive an input signal from a power line, wherein the input signal includes symbols and wherein each of the symbols includes samples; and
    a demodulator module configured to demodulate the input signal received from the analog front end to generate a demodulated signal, wherein the demodulator module includes an impulse noise module configured to detect and remove an impulse noise in the symbols of the input signal, and wherein the impulse noise module comprises:
    a magnitude measurement module configured to determine an average magnitude of the samples in the symbols of a portion of a preamble of the input signal and to set a magnitude threshold based on the average magnitude;
    a coarse detection module configured to use a sliding window and the magnitude threshold to determine one or more positions of the impulse noise in T adjacent symbols, wherein T is an integer greater than zero; and
    a fine detection module configured to locate rising and falling edges of the impulse noise based on one or more of the positions and to determine one or more erase positions based on the rising and falling edges.

2. The receiver for the PLC device of claim 1, wherein the receiver further includes a forward error correction (FEC) decoder module configured to decode the demodulated signal received from the demodulator module.

3. The receiver for the PLC device of claim 1, wherein the coarse detection module is further configured to:
    a) compare a magnitude of the samples in the sliding window with the magnitude threshold;
    b) increase a first count when the magnitude of the samples in the sliding window is greater than or equal to the magnitude threshold;
    c) record a position of the sliding window as a coarse position when the first count is greater than or equal to a first predetermined count; and
    d) move the sliding window and repeat a), b), and c) until the sliding window is located at a last one of the samples.

4. The receiver for the PLC device of claim 3, wherein the coarse detection module is further configured to:
    a') compare a magnitude of one of the samples in a first sliding window with the magnitude threshold;
    b') compare a magnitude of one of the samples in a second sliding window with the magnitude threshold, wherein the first and second sliding windows are contiguous;
    c') increase a second count when the magnitude of the one of the samples in the first sliding window is greater than or equal to the magnitude threshold;
    d') increase a third count when the magnitude of the one of the samples in the second sliding window is greater than or equal to the magnitude threshold;
    e') repeat a'), b'), c'), and d') for all of the samples in the first and second sliding windows;
    f') if both the second count and the third count are greater than or equal to the first predetermined count, record a backup position for the first and second sliding windows;
    g') if either the second count or the third count is greater than or equal to a second predetermined count, record a backup position for a corresponding one of the first sliding window or the second sliding window depending on which count was exceeded; and h') move the first and second sliding windows and repeat a'), b'), c'), d'), and e') until the second sliding window is at the last one of the samples.

5. The receiver for the PLC device of claim 4, wherein the fine detection module is configured to detect the rising and falling edges of the impulse noise in one or more coarse positions.

6. The receiver for the PLC device of claim 5, wherein:
if the fine detection module does not detect a rising edge or a falling edge in T symbols and some of the one or more backup positions are recorded for all of the T symbols, wherein T is an integer greater than zero, the fine detection module sets a detection flag; and
if the fine detection module does not detect the rising edge or the falling edge in the T symbols and the one or more backup positions are not recorded for all of the T symbols or for an entire symbol when T is equal to one, the fine detection module turns off the detection flag.

7. The receiver for the PLC device of claim 6, wherein:
when the fine detection module detects the falling edge and does not detect the rising edge before the falling edge and the detection flag is on, the fine detection module turns off the detection flag and sets an erase position based on a beginning of a first one of the T symbols and the falling edge;
when the fine detection module detects the falling edge and does not detect the rising edge before the falling edge, the detection flag is not on and the falling edge is not inside of the backup position, the fine detection module sets the erase position based on the falling edge and a backward adjustment; and
when the fine detection module detects the falling edge and does not detect the rising edge before the falling edge, the detection flag is not on and the falling edge is inside of the backup position, the fine detection module sets the erase position based on a start of the backup position and the falling edge.

8. The receiver for the PLC device of claim 6, wherein when the fine detection module detects the rising edge and does not detect the rising edge before the falling edge:
if the rising edge occurs between a start and an end of one of the backup positions, the fine detection module turns on the detection flag and sets an erase position based on the rising edge and an end of a corresponding one of the backup positions; and
if the rising edge does not occur between a start and an end of one of the backup positions, the fine detection module turns on the detection flag and sets the erase position based on the rising edge and a forward adjustment.

9. The receiver for the PLC device of claim 5, wherein when the fine detection module detects both a rising edge and a falling edge and the rising edge is detected before the falling edge, the fine detection module stores an erase position based on the rising edge and the falling edge.

10. The receiver for the PLC device of claim 1, wherein the impulse noise module further comprises a noise cancellation module configured to:
when an index of a sample is equal to one of the erase positions:
selectively adjust an amplitude and a phase of an erase sample;
selectively erase the sample;
selectively scale a magnitude of the sample; or
selectively saturate the magnitude of the sample based on a threshold.

11. A method for operating a receiver for a power line communication (PLC) device, comprising:
receiving an input signal from a power line, wherein the input signal includes symbols and wherein each of the symbols includes samples;
detecting and removing an impulse noise in the symbols of the input signal; and
demodulating the input signal received from the power line to generate a demodulated signal;
wherein the detecting and removing the impulse noise in the symbols of the input signal comprise:
determining an average magnitude of the samples in the symbols of a portion of a preamble of the input signal;
setting a magnitude threshold based on the average magnitude;
using a sliding window and the magnitude threshold to determine one or more positions of impulse noise in T adjacent symbols, wherein T is an integer greater than zero;
locating rising and falling edges of the impulse noise based on one or more of the positions; and
determining one or more erase positions based on the rising and falling edges.

12. The method of claim 11, wherein the detecting and removing the impulse noise further comprise:
a) comparing a magnitude of the samples in the sliding window with the magnitude threshold;
b) increasing a first count when the magnitude of the samples in the sliding window is greater than or equal to the magnitude threshold;
c) recording a position of the sliding window as a coarse position when the first count is greater than or equal to a first predetermined count; and
d) moving the sliding window and repeating a), b), and c) until the sliding window is located at a last one of the samples.

13. The method of claim 12, wherein the detecting and removing the impulse noise further comprise:
a') comparing a magnitude of one of the samples in a first sliding window with the magnitude threshold;
b') comparing a magnitude of one of the samples in a second sliding window with the magnitude threshold, wherein the first and second sliding windows are contiguous;
c') increasing a second count when the magnitude of the one of the samples in the first sliding window is greater than or equal to the magnitude threshold;
d') increasing a third count when the magnitude of the one of the samples in the second sliding window is greater than or equal to the magnitude threshold;
e') repeating a'), b'), c'), and d') for all of the samples in the first and second sliding windows;
f') if both the second count and the third count are greater than or equal to a first predetermined count, recording a backup position for the first and second sliding windows;
g') if either the second count or the third count is greater than or equal to a second predetermined count, record a backup position for a corresponding one of the first sliding window or the second sliding window depending on which count was exceeded; and
h') moving the first and second sliding windows and repeating a'), b'), c'), d'), and e') until the second sliding window is located at a last one of the samples.

14. The method of claim 13, wherein the detecting and removing the impulse noise further comprise detecting the rising and falling edges of the impulse noise in one or more coarse positions.

15. The method of claim 14, wherein the detecting and removing the impulse noise further comprise:
- if a rising edge or a falling edge is not detected in T symbols and some of the one or more backup positions are recorded for all of the T symbols, wherein T is an integer greater than zero, setting a detection flag; and
- if the rising edge or the falling edge in the T symbols are not detected and the one or more backup positions are not recorded for all of the T symbols or for an entire symbol when T is equal to one, turning off the detection flag.

16. The method of claim 15, wherein the detecting and removing the impulse noise further comprise:
- when the falling edge is detected, the rising edge is not detected before the falling edge and the detection flag is on, turning off the detection flag and setting an erase position based on a beginning of a first one of the T symbols and the falling edge;
- when the falling edge is detected and the rising edge is not detected before the falling edge, the detection flag is not on and the falling edge is not inside of the backup position, setting the erase position based on the falling edge and a backward adjustment; and
- when the falling edge is detected and the rising edge is not detected before the falling edge, the detection flag is not on and the falling edge is inside of the backup position, setting the erase position based on a start of the backup position and the falling edge.

17. The method of claim 15, wherein the detecting and removing the impulse noise further comprise when the rising edge is detected and the rising edge is not detected before the falling edge:
- if the rising edge occurs between a start and an end of one of the backup positions, turning on the detection flag and setting an erase position based on the rising edge and an end of a corresponding one of the backup positions; and
- if the rising edge does not occur between a start and an end of one of the backup positions, turning on the detection flag and setting the erase position based on the rising edge and a forward adjustment.

18. The method of claim 14, wherein the detecting and removing the impulse noise further comprise storing an erase position based on a rising edge and a falling edge when both the rising edge and the falling edge are detected and the rising edge is detected before the falling edge.

19. The method of claim 11, wherein the detecting and removing the impulse noise further comprise, when an index of a sample is equal to one of the erase positions:
- selectively adjusting an amplitude and a phase of an erase sample;
- selectively erasing the sample;
- selectively scaling a magnitude of the sample; or
- selectively saturating the magnitude of the sample based on a threshold.

\* \* \* \* \*